United States Patent
Kasim

Patent Number: 5,865,557
Date of Patent: Feb. 2, 1999

[54] CLEVIS WITH IMPROVED PIN LOCKING ASSEMBLY

[75] Inventor: Rikos A. Kasim, Mukwonago, Wis.

[73] Assignee: Harnischfeger Corporation, St. Francis, Wis.

[21] Appl. No.: 892,448

[22] Filed: Jul. 14, 1997

[51] Int. Cl.⁶ ............ F16B 21/00; F16B 21/10; F16B 21/16
[52] U.S. Cl. ............ 403/79; 403/157; 403/316
[58] Field of Search ............ 403/79, 97, 157, 403/158, 150, 154, 161, 326, 316, 317, 318, 22; 59/86

[56] References Cited

U.S. PATENT DOCUMENTS

| | | | |
|---|---|---|---|
| 4,164,378 | 8/1979 | Linehan | 403/161 X |
| 4,221,252 | 9/1980 | Bruce | 151/5 |
| 4,936,612 | 6/1990 | Kohn | 403/326 X |
| 5,286,130 | 2/1994 | Mueller | 403/79 |
| 5,352,056 | 10/1994 | Chandler | 403/79 |
| 5,393,162 | 2/1995 | Nissen | 403/150 X |
| 5,577,858 | 11/1996 | Kasim et al. | 403/316 |

FOREIGN PATENT DOCUMENTS

| | | | |
|---|---|---|---|
| 676677 | 7/1952 | United Kingdom | 44/99 I |

*Primary Examiner*—Anthony Knight
*Assistant Examiner*—John R. Cottingham
*Attorney, Agent, or Firm*—Jansson, Shupe, Bridge & Munger, Ltd.

[57] ABSTRACT

Disclosed is a clevis of the type used with a digging bucket. The clevis is of the type having a pivot pin and a pin locking assembly. In the improvement, the pivot pin is cylindrical, has first and second opposing ends and at least one hole traversing the pin diameter. A first boss is affixed on the clevis around the first end and such boss has a plurality of key slots formed therein. A retaining ring is seated in each of the key slots and a first retaining pin extends through the hole and the retaining rings. Most preferably, the clevis has another boss at the pivot pin second end and another retaining pin extends through the pivot pin second end. A new method is also disclosed.

4 Claims, 5 Drawing Sheets

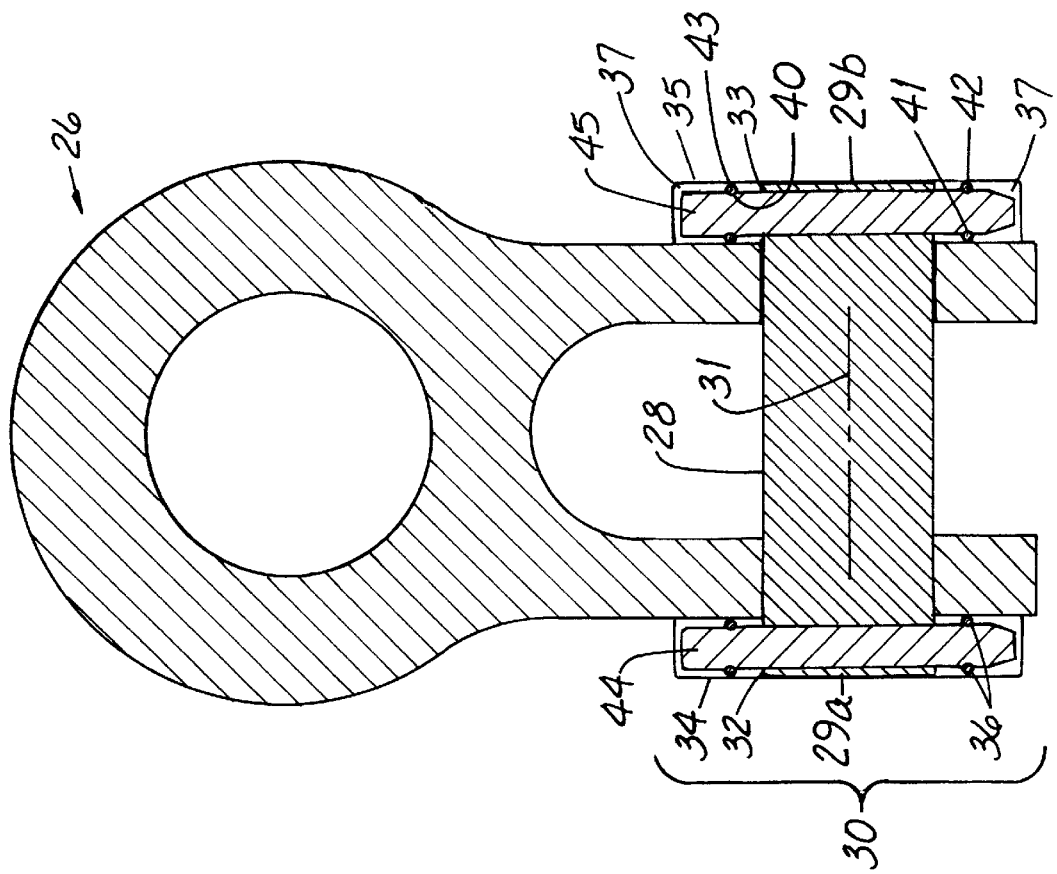
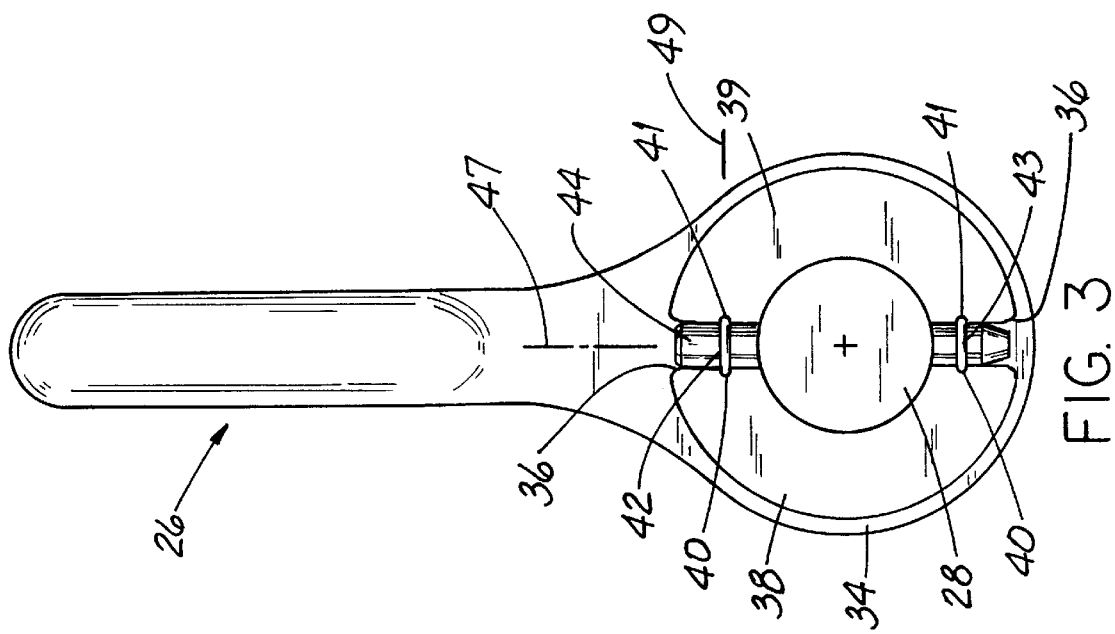

CLEVIS WITH IMPROVED PIN LOCKING ASSEMBLY

FIELD OF THE INVENTION

This invention relates generally to joints and connections and, more particularly, to joints and connections having relatively-movable members pin-connected to one another.

BACKGROUND OF THE INVENTION

Many types of machines and machine accessories have components which move relative to one another or to some other part of the machine. Components involving linear or pivoting relative movement are abundant.

One type of machine having parts involving relative pivoting movement is known as a dragline, a type of excavating machine equipped with an extending boom from which is suspended a digging bucket. To excavate, the bucket is placed on the ground away from the machine. With its teeth rearward (facing the machine), such bucket is drawn (or "dragged") toward such machine by taut cable. When the bucket is filled, it is hoisted by other taut cables and the machine is then rotated to dump the bucket contents on a spoil pile.

During digging and later bucket emptying, such bucket must assume a variety of "attitudes," i.e., a horizontal position to dig and a steeply-angled or vertical position to empty. The hoisting cables are attached to chain-link "rigging" which, in turn, is attached to the bucket by U-shaped clevises. The use of such pivoting devises permits the bucket to be supported by the rigging and the hoisting cables and yet assume the positions required for digging and bucket emptying.

Bucket-clevis attachment is by a pivot pin extending through both "legs" of the clevis and through the bucket. The bucket, clevis and pin are subjected to extraordinary wear and impact. (In fact, it is difficult to envision the rigors of bucket service without actually having seen a dragline in operation.) By reason of such very hard service, it is preferred that the pin have a relatively-high hardness for longer pin life.

It is also important that the pivot pin be securely retained so that the bucket and clevis do not separate from one another. But when the pin is worn to the point that it must be replaced, the structure retaining such pin is preferably quick and easy to remove and replace. A large dragline may represent a capital expenditure of several million dollars— machine downtime is very expensive.

While generally satisfactory, prior art arrangements for retaining a pin have some deficiencies with respect to pin hardness (and consequent "wearability") and ease of pin replacement. In one arrangement, one end of the cylindrical pivot pin is fitted with a cap-like head that prevents such pin from working its way out of the clevis in one direction. Such head is welded to the pin. After the bucket and rigging are assembled in the field, a similar head is welded to the other end of the pin to prevent the pin from working its way out of the clevis in the other direction.

There are two disadvantages to this approach. One is that to replace a pin, one has to "cut" the welded head from at least one end of the pin (by using an acetylene torch, for example) and weld a head on an end of the replacement pin after such pin is installed. This is time consuming and requires that flame cutting equipment and a person skilled as a welder be available on the site.

Another disadvantage to the "welded head" approach is that the hardness of the pin cannot exceed some maximum, e.g., about 400–450 Brinell. A pin of such hardness does not wear as well as desired and it must be replaced with a frequency that, in view of the invention, is unnecessary.

Another approach to pin retention involves using a cylindrical pin without welded heads and mounting a cover at each side of the clevis and over each end of the pin. In a similar approach, the cover mounts tongue-and-groove fashion on straight tracks affixed to the clevis. After being properly positioned, the covers are welded in place. Examples of both approaches are disclosed in U.S. Pat. No. 5,577,858 (Kasim et al.).

While this approach avoids pin welding (and therefore permits using a pin having a hardness of about 650 Brinell), it does or at least may not avoid welding altogether. As a consequence, the user of such approach is likely to experience at least some of the downtime and equipment and personnel problems mentioned above.

Still another way of retaining a pin in a clevis is disclosed in U.S. Pat. No. 4,221,252 (Bruce). In the locking arrangement of the Bruce patent, the main shackle pin has at least one end which is machined to have a reduced diameter. Such end is also machined to have a pocket axially receiving a plug which retains the locking pin crosswise in the main shackle pin. And the locking pin also has a tapered groove machined in it.

An improved pin-retaining structure and method which minimize the amount of machining required in manufacture, which avoid welding when installing or replacing a pin in the field, which reduce downtime and which involve only commonly-available tools and personnel skills would be an important advance in the art.

OBJECTS OF THE INVENTION

An object of the invention is to provide a new device and method for retaining a pin in a pin locking assembly associated with a clevis that overcomes some of the problems and shortcomings of the prior art.

Another object of the invention is to provide a device and method for retaining a pin in a pin locking assembly that eliminates the need for an on-site welder.

Another object of the invention is to provide a pin-retaining device which is easy to manufacture and involves minimal machining.

Still another object of the invention is to provide a device and method for retaining a pin in a pin locking assembly that can be quickly installed.

How these and other objects are accomplished will become apparent from the following descriptions and from the drawings.

SUMMARY OF THE INVENTION

This invention finds its greatest utility in large "earth-working" digging buckets and involves a clevis and a pin retention device of the type having a pivot pin and a pin locking assembly. In the improvement, the pivot pin is cylindrical and has first and second opposing ends and at least one hole traversing the pin diameter. A first boss having a plurality of key slots is affixed on the clevis around the first end, a retaining ring is seated in each of the key slots and a first retaining pin extends through the hole and the retaining rings.

In a highly preferred embodiment of the invention (providing "double-ended" locking), the pivot pin has a second hole traversing its diameter. A second boss having a plurality of key slots is affixed on the clevis around the second end and a second retaining ring is seated in each of such key slots. A second retaining pin extends through the second hole and the second retaining rings in the second boss.

In a highly preferred embodiment of the invention, the retaining pin has at least one groove in it and the groove is in registry with the retaining ring when the retaining pin is positioned through the ring and the hole in the pivot pin. In a specific version of such embodiment, the first and second retaining pins each have at least one groove formed therein, and the grooves are in registry with the first and second retaining rings when the first and second retaining pins are positioned through the first and second rings and through the first and second holes in the pivot pin.

Another aspect of the invention involves a method for attaching a digging bucket chain link and a clevis to one another. This method is comprised of the steps of: (1) providing a clevis having an aperture therethrough and a pin retention boss around the aperture; (2) aligning the aperture with the link; (3) inserting a pivot pin through the aperture and the link; (4) seating a retaining ring in a key slot formed in the boss; and (5) placing a retaining pin through the retaining ring and the pivot pin.

In a preferred embodiment of the invention, the retaining pin has a groove in it which is spaced radially outwardly from the pivot pin and the placing step is followed by aligning the groove with the retaining ring so that the retaining ring is seated in the groove of the retaining pin. In yet another preferred embodiment, the pin has a central long axis and an outer cylindrical surface spaced from the axis by a first dimension, and the key slot is spaced from the axis by a second dimension greater than the first dimension.

Other details of the invention are set forth in the following detailed description and in the drawings.

BRIEF DESCRIPTIONS OF THE DRAWINGS

FIG. 3 is an elevation view of a representative clevis device which may be used with the bucket of FIG. 2.

FIG. 4 is a sectional view of another representative clevis device.

DETAILED DESCRIPTIONS OF PREFERRED EMBODIMENTS

Figure 1:
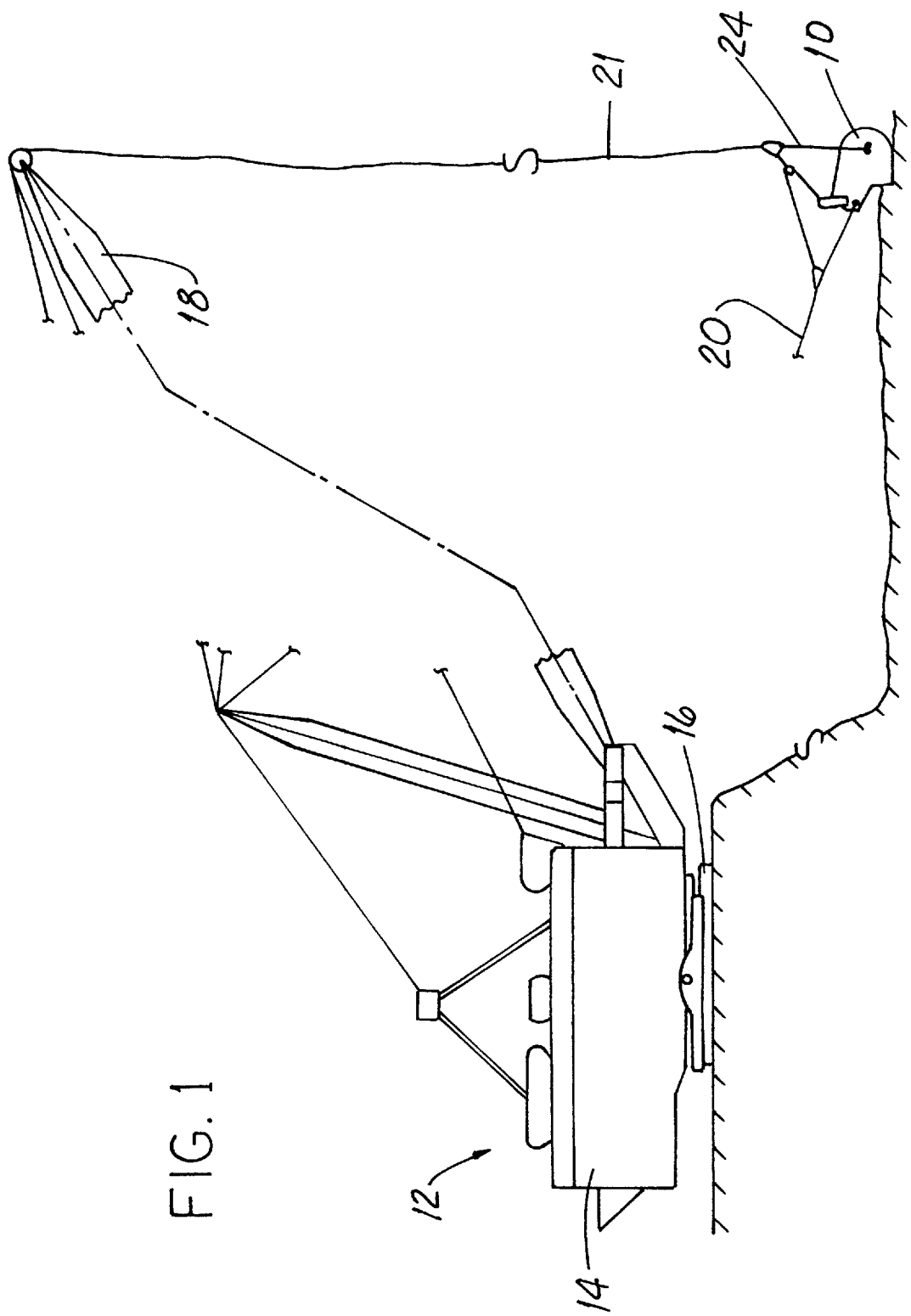
FIG. 1 is a representative view with parts broken away of an excavating dragline.
Figure 2:
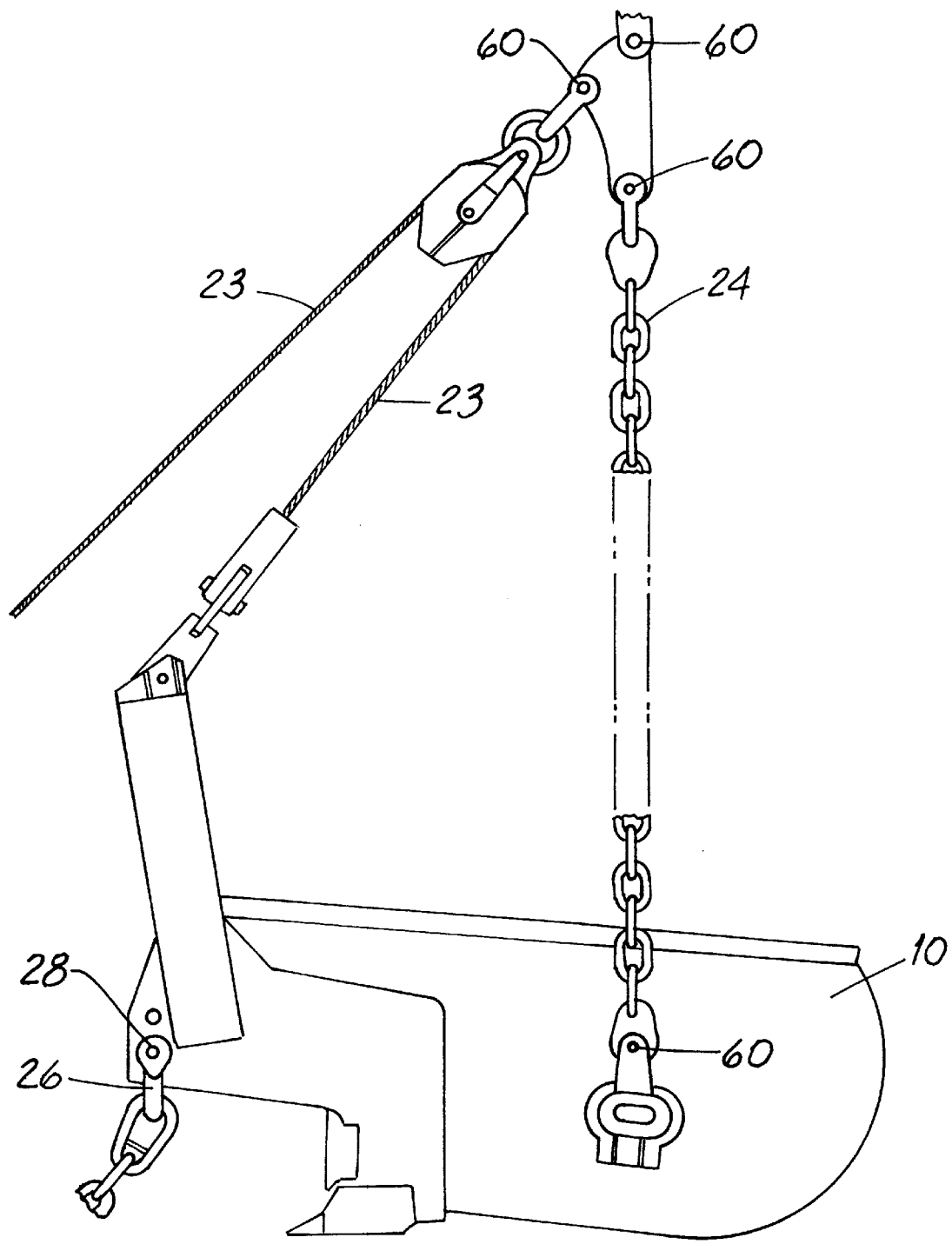
FIG. 2 is a side elevation view of a bucket apparatus used with the dragline of FIG. 1.

As shown in FIGS. 1 and 2, this invention finds its greatest utility in large "earthworking" digging buckets 10. Such buckets 10 are used in machines known as draglines. These machines 12 have an upper machinery housing 14 which pivots on a base 16. The extended boom 18 supports and manipulates a digging bucket 10 which, in preparation for digging, is placed away from the machine 12 as generally shown in FIG. 1.

As the rear-facing bucket 10 is drawn toward the machine 12 by the drag cable 20, such bucket 10 fills with rock, soil, coal or the like. And when it is filled, the bucket 10 is hoisted by the cable 21 and the machine 12 is pivoted in one direction or the other so that the contents of the bucket 10 may be placed on a spoil pile. Bucket dumping is by releasing tension on the dump block line 23.

Referring particularly to FIGS. 1, 2, 3 and 4, the bucket 10 includes rigging 24 used to suspend the bucket 10 from the cable 21. The drag cable 20 is attached to such bucket 10 by a pivoting clevis 26 and a pivot pin 28 secures the clevis 26 and the bucket 10 to one another. Details of the inventive improvement to the pin-retaining structure will now be set forth.

The invention involves a clevis 26 and a pin retention device of the type having a pivot pin 28 and a pin locking assembly 30. The pivot pin 28 is cylindrical and has first and second opposing ends 29a, 29b. In a specific embodiment, the ends 29a, 29b are substantially planar and the pin 28 has a substantially uniform diameter between the ends 29a, 29b. And but for a hole 32 or 33 (or both holes 32, 33) described below, the pin 28 is substantially "homogeneous" or solid along its length. That is, between the holes 32, 33, the pin 28 is free of internal cavities, bores or the like.

The pin 28 has at least one hole 32 spaced slightly inwardly of a pin end 29a, 29b and traversing the pin diameter. Most preferably, the hole 32 is oriented along an axis perpendicular to the pin long axis 31. In a highly preferred embodiment described below, the pin 28 has two holes 32, 33.

Permanently affixed to the clevis 26 (by, e.g., welding or integral casting) is a first boss 34 having a plurality of pin-receiving notches 36 formed therein. (Considered another way, the boss 34 has a pair of C-shaped boss segments 38, 39 and the ends of each segment are spaced from the corresponding ends of the other segment to define the notches 36 therebetween.) The notches 36 are in registry with an axis 47 that is generally perpendicular to the long axis 31 of the pin 28.

The boss 34 has a pair of ring-receiving key slots 40 formed therein and each such slot 40 is in registry with a respective notch 36. Each slot 40 is generally circular and coincident with a plane 49 that is generally parallel to the pin axis 31.

When the pin 28 is in place, the boss 34 is around the first end of the pin 28. A separate retaining ring 42 is seated in each of the key slots 40 and a first retaining pin 44 extends through the notches 36, through the slots 40, through the hole 32 and through the retaining rings 42.

FIG. 4 shows a highly preferred embodiment of the invention (providing "double-ended" locking), wherein the pivot pin 28 has a second hole 33 traversing the pin diameter. Like the first hole 32, the second hole 33 is perpendicular to the pin axis 31.

A second boss 35, also permanently affixed to the clevis 26 is substantially a mirror image of the first boss 34. The second boss 35 has a plurality of notches 37 and corresponding key slots 41 and when the pin 28 is in place in the clevis 26, the second boss 35 is around the pin second end 29b. Separate retaining rings 43 are seated in each of the key slots 41 and a second retaining pin 45 extends through the notches 37, through the slots 41, through the hole 33 and through the retaining rings 43.

Figure 5:
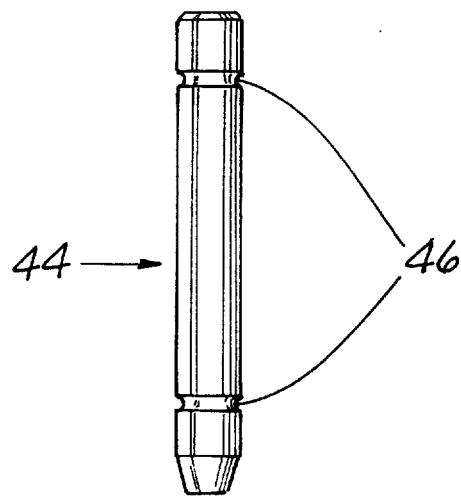
FIG. 5 is an elevation of the retaining pin used in the clevis shown in FIG. 3.
Figure 6:
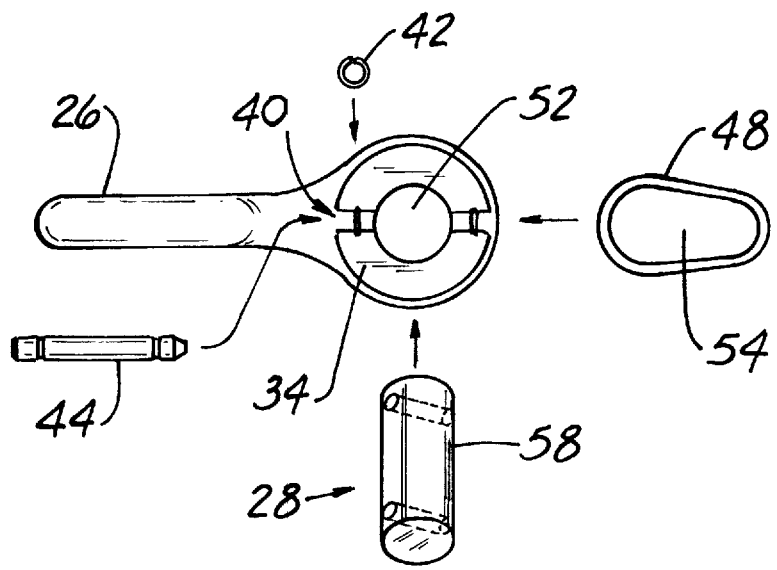
FIG. 6 is an exploded view including a clevis, a link, a pivot pin, a retaining pin and a retaining ring.
Figure 7:
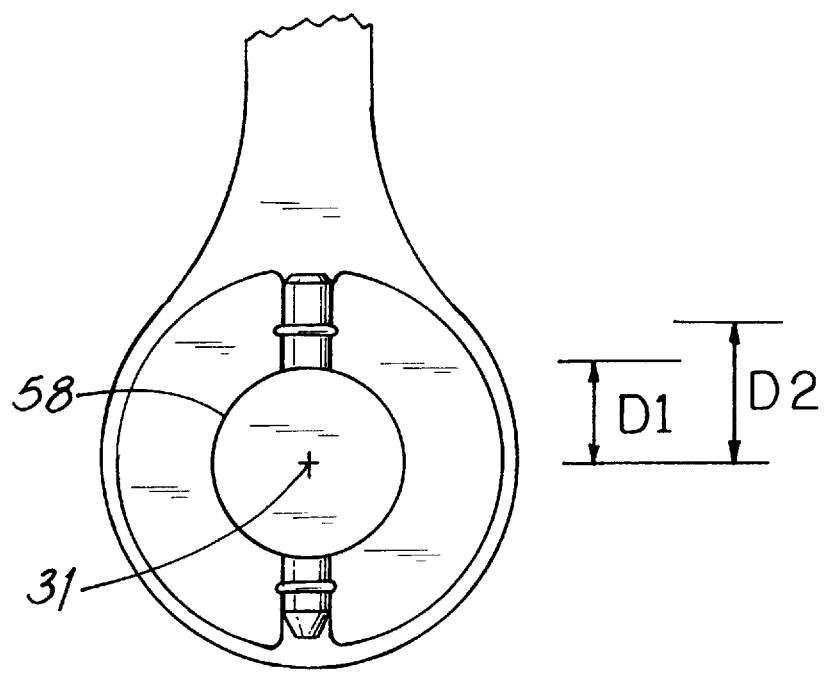
FIG. 7 is an elevation view generally like that of FIG. 3 and showing certain dimensional relationships. Parts are broken away.

In a highly preferred embodiment of the invention, as shown in FIG. 5, the retaining pin 44 (or each retaining pin 44, 45 if two such pins are used) has at least one groove 46 in it. When the retaining pin 44 is positioned to secure the pivot pin 28, the groove 46 is in registry with a retaining ring and a notch, e.g., ring 42 and notch 36. In an even-more-specific version of the invention, both pins 44, 45 have two spaced-apart grooves 46 formed therein. When the pins 44, 45 are positioned to retain the pivot pin 28, the grooves 46, the retaining rings 42, 43, and the corresponding slots 40, 41 are in registry with one another.

Referring next to FIGS. 3, 4, 5, 6 and 7, another aspect of the invention involves a method for attaching a digging bucket chain link 48 and a clevis 26 to one another. This method is comprised of the steps of: (1) providing a clevis 26 having an aperture 52 therethrough and a pin retention boss 34 around the aperture 52; (2) aligning the aperture 52 with the link opening 54; (3) inserting a pivot pin 28 through the aperture 52 and the opening 54; (4) seating a retaining ring 42 in a slot 40 formed in the boss 34; and (5) placing a retaining pin 44 through the retaining ring 42 and the pivot pin 28.

In a highly preferred method, the retaining pin 44 has a groove 46 in it which is spaced radially outwardly from the pivot pin 28 and the placing step is followed by aligning the groove 46 with the retaining ring 42 so that the retaining ring 42 is seated in the groove 46 of the retaining pin 44. The pin 28 has a central long axis 31 and an outer cylindrical surface 58 spaced from the axis 31 by a first dimension D1. The slot 40 is spaced from the axis 31 by a second dimension D2 greater than the first dimension D1.

The pin locking assembly 30 disclosed herein has wide utility in making connections relating to the bucket 10. Such assembly 30 is suitable for use at any of the locations 60 shown in FIG. 1.

While the principles of the invention have been shown and described in connection with but a few embodiments, it is to be understood clearly that such embodiments are by way of example and are not limiting. For example, the holes 32 in the pivot pin 28 which receive the retaining pins 44 need not be parallel to one another. That is, the axes defined by such holes 32 can be rotated relative to the pivot pin long axis. (Of course, notches 36 and key slots 40 associated with a particular retaining pin 44 would be appropriately re-oriented.) While such variants are entirely within the scope of the invention, they are more difficult to manufacture and, perhaps, more difficult to use.

What is claimed:

1. In a clevis for a digging bucket having a pivot pin and a pin locking assembly, the improvement wherein:

the pivot pin is cylindrical, has a pin long axis, first and second opposing ends and at least one hole traversing the pin diameter;

a first boss is permanently affixed on the clevis around the first end and has a plurality of key slots;

a separate retaining ring is seated in each of the key slots;

a first retaining pin extends through the hole and the retaining rings;

the first retaining pin engages the first boss, thereby preventing rotation of the pivot pin about the pin long axis.

2. The clevis of claim 1 wherein:

the retaining rings are first retaining rings;

the pivot pin has a second hole traversing the pin diameter;

a second boss is permanently affixed on the clevis around the second end and has a plurality of key slots;

the clevis includes a pair of second retaining rings, each one of the pair of second retaining rings is seated in a separate one of the key slots of the second boss; and a second retaining pin extends through the second hole and the second retaining rings in the second boss.

3. The clevis of claim 1 wherein:

the first boss includes a pair of spaced-apart boss segments defining a pair of notches therebetween; and the first retaining pin is received in the notches.

4. The clevis of claim 2 wherein:

the first and second retaining pins each have at least one groove formed therein;

the grooves are in registry with the first and second retaining rings, respectively, when the first and second retaining pins are positioned through the first and second rings, respectively, and through the first and second holes in the pivot pin; and two of the retaining rings are in registry with a plane parallel to the pin long axis.

* * * * *